US006868303B1

(12) United States Patent
Chabirand Garçonnet et al.

(10) Patent No.: US 6,868,303 B1
(45) Date of Patent: Mar. 15, 2005

(54) METHOD FOR AUTOMATICALLY PLACING PARTS ON LEATHER PIECES WITH NON-HOMOGENEOUS CHARACTERISTICS

(75) Inventors: Didier Chabirand Garçonnet, Cestas (FR); Alain Vallortigara, Andernos (FR)

(73) Assignee: Lectra SA, Cestas (FR)

( * ) Notice: Subject to any disclaimer, the term of this patent is extended or adjusted under 35 U.S.C. 154(b) by 0 days.

(21) Appl. No.: 09/600,337

(22) PCT Filed: Nov. 12, 1999

(86) PCT No.: PCT/FR99/02781

§ 371 (c)(1), (2), (4) Date: Aug. 28, 2000

(87) PCT Pub. No.: WO00/29627

PCT Pub. Date: May 25, 2000

(30) Foreign Application Priority Data

Nov. 13, 1998 (FR) ........................................... 98 14255

(51) Int. Cl.[7] ............................................... G06F 19/00
(52) U.S. Cl. ........................ 700/135; 700/171; 382/111
(58) Field of Search ................................ 700/125, 135, 700/171; 382/111

(56) References Cited

U.S. PATENT DOCUMENTS

| | | | | |
|---|---|---|---|---|
| 4,725,961 A | * | 2/1988 | Pearl | 700/171 |
| 5,258,917 A | | 11/1993 | Bruder | 700/171 |
| 5,757,950 A | * | 5/1998 | Bruder | 382/111 |
| 5,953,232 A | * | 9/1999 | Blaimschein | 700/171 |

FOREIGN PATENT DOCUMENTS

| | | |
|---|---|---|
| DE | 195 21 514 | 10/1996 |

OTHER PUBLICATIONS

Aranda Penaranda J. D., et al: *Inspection And Measurement Of Leather System Based on Artificial Vision Techniques Applied to the Automation and Waterjet Cut Direct Application, Proceedings of the International Conference on Systems, Man, and Cybernetics,* Oct. 1994.

* cited by examiner

*Primary Examiner*—Leo Picard
*Assistant Examiner*—Sheela S. Rao
(74) *Attorney, Agent, or Firm*—Smith, Gambrell & Russell, LLP

(57) ABSTRACT

A method for laying out pieces to be cut out from a remnant of flexible material, the cut out pieces being used to manufacture an article. A mask generic to remnants of a given type is generated. The at least one generic mask is subdivided into zones which correspond to different gradations of a characteristic of the remnant, e.g. leather color or leather grain. At least some of the pieces to be cut out are assigned a set of constraints including at least one value constraint for a characteristic of the remnant. At least some of the pieces to be cut out are linked to each other, for example, as a function of the constraints assigned to the respective pieces. The at least one generic mask is applied to a particular remnant of the given type to subdivide the particular remnant into zones having uniform characteristics. The pieces to be cut out are automatically laid out on the particular remnant as a function of any constraints assigned to the pieces, and in compliance with the links defined between the pieces.

22 Claims, 11 Drawing Sheets

METHOD FOR AUTOMATICALLY PLACING PARTS ON LEATHER PIECES WITH NON-HOMOGENEOUS CHARACTERISTICS

FIELD OF THE INVENTION

The invention relates to automatically laying out pieces to be cut out from remnants (i.e. short lengths) of flexible material with characteristics that are not uniform, in particular natural leathers or hides.

The field of application of the invention is the field of manufacturing articles, in particular made of leather or fur, and requiring pieces cut out from such remnants to be assembled together. The industries manufacturing the following articles are particularly concerned: furniture, upholstery, in particular automobile upholstery, leather goods, bags, shoes, and clothing.

BACKGROUND OF THE INVENTION

For reasons of aesthetic appearance and of quality, in order to make the various portions of an article, it is necessary to choose pieces of appearance that is similar to degrees that vary, in particular as a function of their proximity and of their locations in the article.

For example, for leather, and in particular for a leather sofa, a high degree of similitude in appearance is sought between the pieces forming each seat back, between the pieces forming each seat cushion, between the seat backs, between the seat cushions, and between each seat back and each corresponding lumbar support cushion. However, a lower degree of similitude can be accepted between seat backs and seat cushions, between armrests and seat backs, and between armrests and seat cushions. A lower degree of similitude is also acceptable for the pieces serving to trim the structure of the sofa, both between said pieces, and between them and the other pieces.

Unfortunately, leathers, and in particular natural leathers, are not uniform in appearance and quality. That applies not only to different hides, even when they come from the same batch, but also to any one hide. Variations in color shade, grain size, and leather quality can be observed between different zones of the same hide, and, within any one zone, the appearance can vary, e.g. between matt and glossy, depending on the angular position of the hide relative to an observer. That applies regardless of the origin of the leather.

For natural leathers, the layout of the component pieces of an article must therefore satisfy certain constraints. In addition, any flaws must be taken into account. Depending on their seriousness, such flaws can preclude the use of certain zones of the leather, or restrict such use to pieces which can accept such flaws, e.g. because of their locations in the final article. To a lesser degree, such a requirement to satisfy constraints also exists for leathers that are not totally natural, e.g. pigmented leathers which are of uniform color, or corrected leathers or flesh splits that have been embossed to give a grain effect, after buffing or splitting.

Currently, and in particular for laying out pieces for high-quality articles of furniture or upholstery, the task is entrusted to the know-how of an operator capable of ensuring that all of the constraints are satisfied.

It is desirable to have a method making it possible to perform such laying out automatically, so as to avoid the need for laying out to be performed by an operator, and so as to optimize layouts better in order to waste as little as possible of a costly raw material.

Proposals have been made to automate laying out on leathers.

German Patent DE 195 21 514 describes a method comprising digitizing the outlines of the hides and detecting flaws organized into various categories with which different colors are associated. Laying out is performed either by an operator on the basis of an image showing the outline of the hide and the colored flawed zones, or else automatically by implementing suitable software.

A similar method is described in U.S. Pat. No. 5,258,917, the layout taking account of a possible additional constraint, namely the desirable proximity on a hide of portions of outlines of different pieces.

OBJECT AND SUMMARY OF THE INVENTION

An object of the invention is to provide a method making it possible for pieces that are to be cut out from leathers, hides, and more generally from remnants of flexible material having non-uniform characteristics, to be laid out automatically while also taking account of the various constraints on the pieces in order to make articles that satisfy particular quality and aesthetic appearance requirements.

According to the invention, a method of automatically laying out pieces to be cut out from remnants of flexible material having non-uniform characteristics, and to be used for making articles, comprises the steps consisting in:

- establishing, for remnants of a determined type, at least one mask whose area is subdivided into various zones which correspond to different value levels of a characteristic of the material of the remnant;
- assigning a set of constraints to at least some of the component pieces of a determined type of article, which set of constraints includes at least one value constraint for a characteristic of the material of the remnant;
- defining links between at least some of the component pieces, which links have different levels as a function in particular of relationships imposed between constraints assigned to the pieces;
- digitizing each remnant in order to obtain an image;
- applying to the image of each remnant the mask or each mask corresponding to the type of the remnant by performing dimension matching so as to subdivide the image of the remnant into various zones having uniform characteristics; and
- laying out automatically by disposing the pieces in the zones of the image of the remnant as a function of any constraints assigned to the pieces, and in compliance with the links defined between the pieces.

Thus, the invention is remarkable firstly in that masks are used which make it possible to define zones of uniform characteristics on the remnants, and secondly in that constraints are assigned and links are defined between the pieces, which constraints and links determine the layout.

Advantageously, a reference axis is associated with each mask and with each remnant, at least one mask is defined per type of remnant, such as a mask comprising zones having different values for the color shade of the material and/or a mask comprising zones having different values for a surface appearance characteristic of the material, the reference axis is defined manually or automatically on each remnant, and each corresponding mask is applied to the image of each remnant by superposing every time the reference axes of the remnant and of the mask.

When leather is used, the reference axis associated with each mask and with each remnant or hide is typically the axis corresponding to the backbone of an animal. For each type of hide, at least one mask is defined comprising zones having different values for the grain of the leather and/or a mask is defined comprising zones having different values for the color shade of the leather.

For a type of remnant, it is also possible to define a maximum percentage by which the material can stretch in predetermined directions, e.g. parallel to and perpendicular to the reference axis, in each uniform zone. The term "remnants of a determined type" is used herein to mean remnants of similar origin, e.g., for leather, hides coming from the same type of animal.

Advantageously, at least some of the component pieces of an article are distributed into groups, each of which comprises one or more pieces. For example, a group comprises the pieces necessary for making a single functional sub-assembly of the article. In each group, the pieces may optionally be linked together by same-level links.

At least some pieces or groups of pieces are assigned one or more constraints chosen in particular from a surface appearance characteristic value, a color shade, and a preferential angular position on the remnant relative to a reference axis of the remnant. It is also possible to associate therewith an indication of the angular positioning tolerance on either side of the preferential angular position. The level of link between two pieces is a function of the looked-for degree of similitude between any constraints assigned to the pieces, and of any location proximity imposed.

Preferably, at least some pieces or some group(s) of pieces are assigned respective degrees of layout priority, so that the laying out process starts with the pieces of the highest degree of priority.

In yet another particularity of the method, the process of digitizing each remnant comprises storing the locations and the degrees of seriousness of any flaws detected on the remnant. Detecting the locations of the flaws and assigning the degrees of seriousness may be performed by visual inspection.

BRIEF DESCRIPTION OF THE DRAWINGS

The invention will be better understood on reading the following description given by way of non-limiting example with reference to the accompanying drawings, in which.

DESCRIPTION OF PREFERRED IMPLEMENTATIONS

In the description below, consideration is given to laying out pieces on hides for making articles of leather. However, the invention is applicable to laying out pieces on remnants of flexible materials other than leather, e.g. on natural hides, which also have non-uniform characteristics such as non-uniform surface appearance characteristics (unevenness, roughness, veining, etc.) and/or non-uniform color characteristics.

Figure 1:
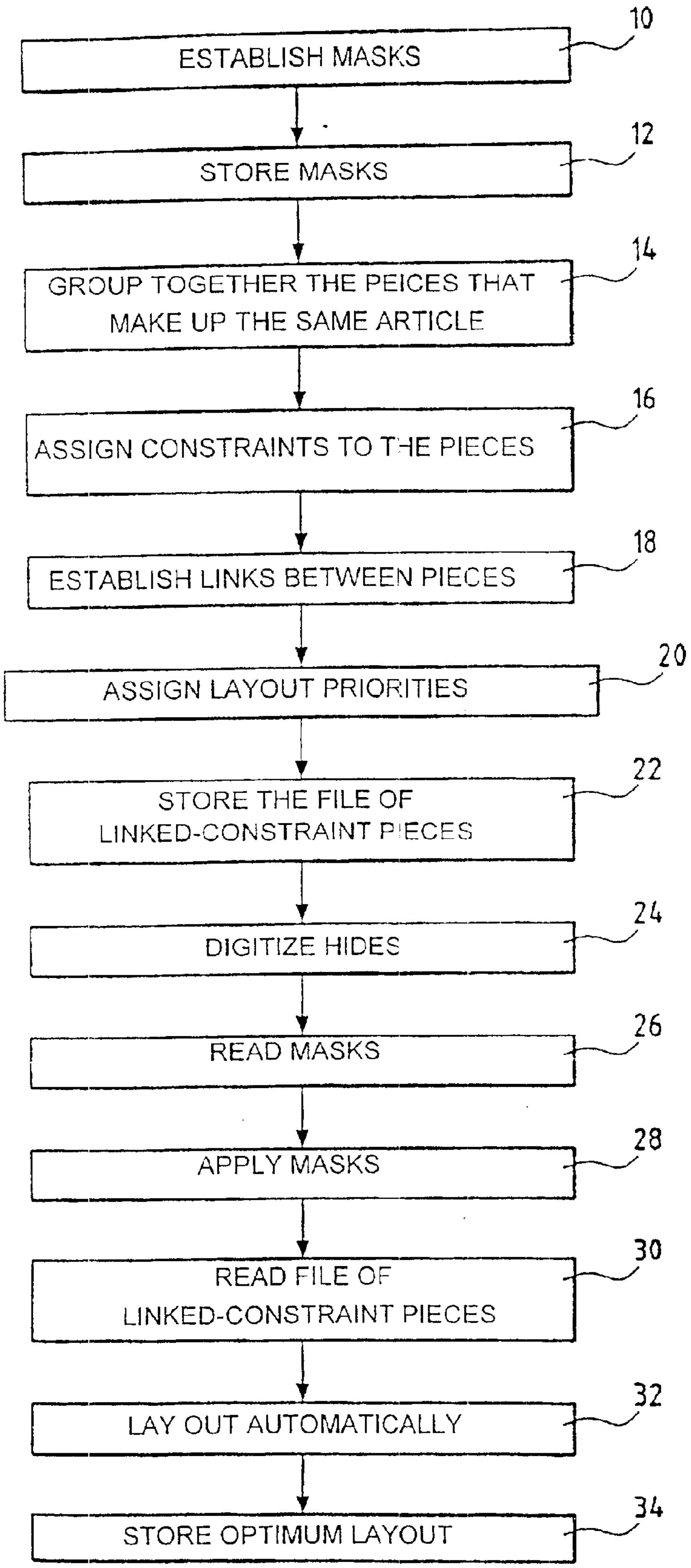
FIG. 1 is a flow chart showing various steps of an implementation of a particular method of the invention.

Reference is made firstly to FIG. 1 which shows the steps making up a particular implementation of a method of the invention, and then a description is given of an example of how it can be used in manufacturing particular leather articles.

In a first characteristic of the method, one or more masks are established (step 10) for a determined type of hide, or for a plurality of determined types of hide that can be used when implementing the method.

The various types of hide are, in particular, those commonly used in the leather industry. They correspond to various types of animal.

Each masks reflects how a characteristic of the corresponding hide is distributed in various zones: variation of leather grain, and variation of leather color shade. It may also show a reference axis, typically corresponding to the location of the backbone of the animal. The zones of a mask are defined so that the characteristic in question is substantially uniform within any one zone, with at least two value levels being associated with each characteristic. The borders between the zones of a mask may be defined loosely, i.e., for example, by associating each line of separation between two adjacent zones with overshoot tolerance data indicating the tolerance for overshooting the border in either direction. The variations of the characteristics in question on a hide are progressive rather than sudden: they satisfy a variation gradient.

Figure 2A:
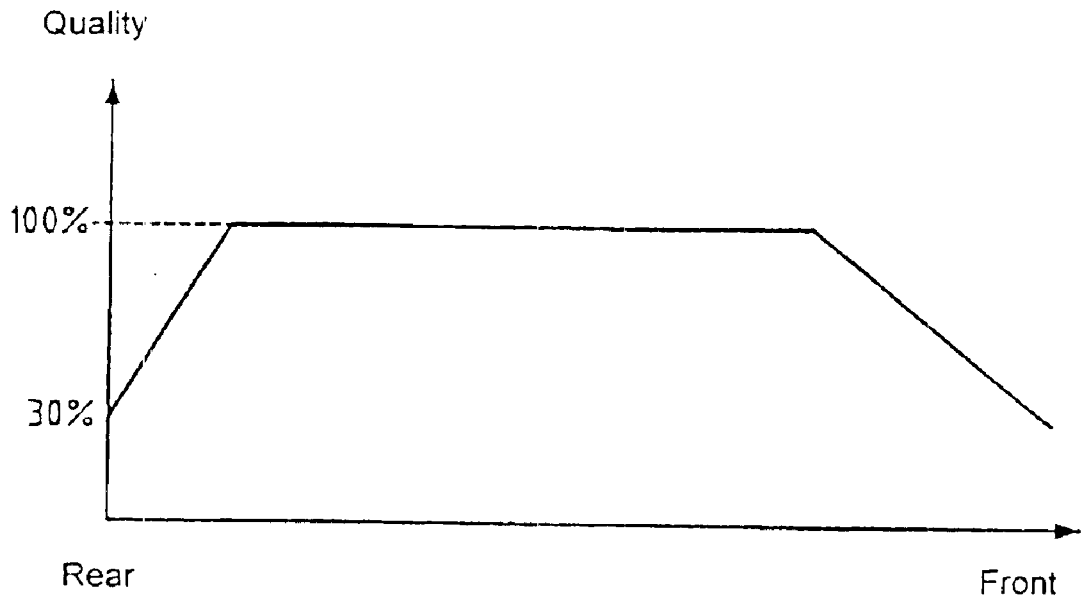
FIGS. 2A and 2B show an example of how hide quality can vary in the longitudinal direction and in the transverse direction.
Figure 2B:
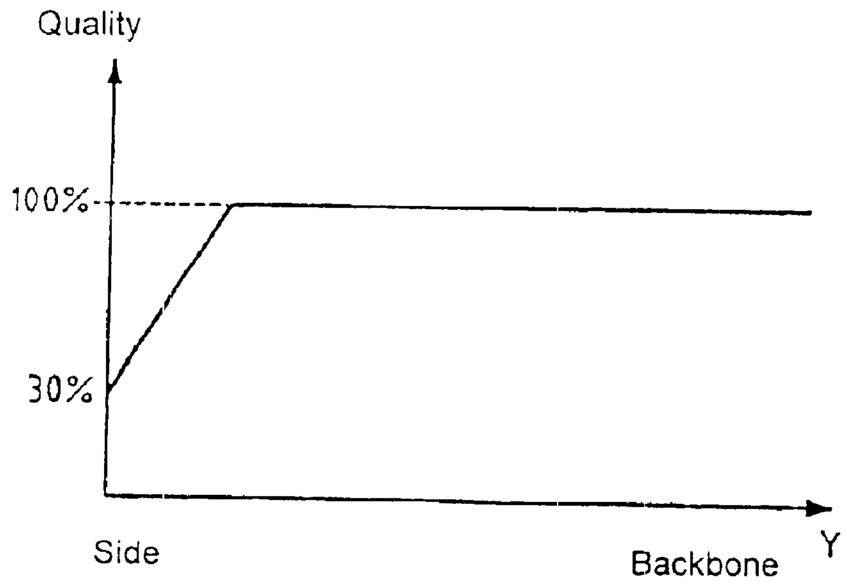

By way of example of the variation of a characteristic of a hide, FIGS. 2A and 2B very diagrammatically show the variation in the quality of a hide respectively between the rear and the front (substantially along the backbone) and between one side and the backbone. In this example, the quality is associated with the size and the uniformess of the grains of the leather.

FIG. 2A shows a high variation in the quality at the rear of the hide (over about 10% of the total length, from a minimum value, corresponding to about 30% of the maximum value observed at the center of the hide, to said maximum value. The maximum quality is observed over about 65% of the length, in the central portion of the hide. At the front, the quality decreases (due to the folds of the neck) with a variation that is less sudden than at the rear, over a distance corresponding to about 25% of the length. FIG. 2B shows a high variation in quality from the side to a distance corresponding to about 20% of the half-width, from about 30% of the maximum quality to said maximum quality.

Naturally, FIGS. 2A and 2B concern a particular type of hide. The variation gradients can be significantly different for other types of hide.

The mask(s) associated with each type of hide are stored (step 12). It is also possible to associate therewith data indicating, for each type of hide, an acceptable stretch percentage by which it is acceptable for the leather to be stretched in at least two directions, such as the direction of the reference axis, and the direction normal thereto. This stretch capacity may be taken into account when subsequently performing laying out on this type of hide.

For making an article of a determined type, comprising an assembly of pieces of leather of predetermined dimensions and shapes, the method may include a step (14) in which the pieces making up the article are grouped together. The grouping together is preferably performed by gathering together in the same group those pieces which are necessary for making a single functional sub-assembly of the article (e.g. a seat back of an armchair). In such a case, the pieces of a group are to be assembled together and they have common outline portions, and so, at least in certain cases, the group of pieces can be considered to be a single piece.

This applies particularly when the pieces making up a sub-assembly must have appearance characteristics that are uniform, for aesthetic reasons, and must be placed side-by-side in a uniform zone of a hide. The pieces of the group are then linked together by links of the highest level. It should be noted that the term "article of a determined type" is used to designate both a particular article, e.g. an armchair, and also a batch of articles normally made in the form of a suite, e.g. a sofa and matching armchairs. It should also be noted that information may be associated with each group, indicating whether the links between the pieces of the group may be broken or not. When it is positive, this information makes it possible to impart greater flexibility during the subsequent laying out step.

The following step (16) of the method consists in assigning one or more constraints to at least some of the pieces making up the article. These constraints are determined by the location of the piece in the article and by the resulting aesthetic considerations. The constraints are chosen in particular from the leather grain value, the color shade value, and the angular position of the piece on the hide. As regards said angular position, differences in appearance can occur depending on whether a piece is cut out while angularly positioned in one direction or another relative to a reference axis of the hide. The characteristic relating to the angular position of the piece on the hide may be associated with angular position tolerance data indicating the maximum angular tolerance authorized for the position of the piece on either side of the specified angular position. Other data useful to laying out may also be associated, e.g. the level of seriousness of leather flaws that is tolerated for each piece.

In another characteristic of the laying out method of the invention, said method includes a step (18) for establishing links between pieces or, when groups of pieces are formed, also between pieces and groups of pieces, or between groups of pieces. The links are organized into a plurality of levels, from the highest to the lowest. At least one component of the link consists of the degree of similitude or of non-similitude between the constraints assigned to the pieces. Another component may consist in the desired proximity between the pieces on the hide, in particular so that they have characteristics that are as close as possible or because they have common outline portions. Thus, the strongest link exists between pieces having the same levels of characteristics (grain size, color shade, angular position) and further assigned a proximity constraint. The proximity constraint between two pieces can be expressed in the form of a maximum distance over the hide between two characteristic points of the two pieces, but also in the form of a maximum difference in grain and/or color value. Pieces linked in this way may belong to the same group. The weakest link exists between pieces not having any characteristic similitude or non-similitude requirement or any proximity constraint, e.g. isolated pieces or pieces that are situated in locations of the article to be made that are normally not exposed or visible.

Another step (20) of the method may consists in assigning a degree of layout priority to at least some of the pieces, or, when groups have been constituted, to one or more groups. More than two priority degree values may be provided. During laying out, the pieces or groups of pieces having the highest priority are laid out first. Preferably they are the pieces or groups of pieces to which the highest constraints are assigned, and those which are linked by the highest level of links, so that the corresponding uniform zones of the or of each hide used are occupied preferentially by these pieces. Decreasing degrees of priority may then be assigned to the remaining pieces of groups of pieces depending on the levels of the links that are assigned to them.

During step 22, any grouping of the pieces, the constraints assigned to the pieces or groups of pieces, and the defined links are stored. This information, in the form of a file of linked constraint pieces, can be used to make a series of articles of the corresponding type.

For making a determined type of article from hides of a determined type, a first operation (step 24) consists in digitizing one or more hides of this type, and, for each hide, in recording the digitized image as well as information about the locations and seriousness of flaws detected on the hide. A reference axis typically corresponding to the backbone of the animal is preferably determined on each hide, so that the digitized image of the hide includes information identifying the location of the reference axis. The locations of the flaws can be indicated manually on the hide and their degrees of seriousness evaluated and input by an operator. In a variant, it is possible to locate the flaws and to rank their levels of seriousness by automatically analyzing the digitized image. The position of the reference axis may be determined by indicating or marking it manually on the hide. In a variant, it is possible to locate the reference axis by automatically analyzing the digitized hide.

The following step (26) consists in searching for the stored mask(s) corresponding to the type of hide used. Optionally, an operator may be able to modify the mask or each mask when the hide or the batch of hides used has a characteristic whose value distribution over the leather differs significantly from the value distribution usually encountered for this type of hide, and taken as a reference for forming the mask corresponding to this characteristic.

Then, the mask(s), as optionally modified, are applied to the image of the or of each digitized hide (step 28) so that the surface of the hide is subdivided into uniform zones. Applying a mask includes size matching, e.g. by scaling up or down to cause the mask to coincide as well as possible with the image of the hide.

The file of linked constraint pieces corresponding to the type of article to be made is read from the prerecorded files (step 30).

Then the automatic laying out process (step 32) is performed. This consists firstly in laying out the pieces or groups of pieces having the highest priority level, on the basis of ordering criteria predefined by the user, then in laying out the following pieces or groups of pieces in decreasing order of priority. For each new piece or each new group of pieces to be laid out, the link(s) existing with a piece or a group of pieces which have already been laid out are examined so as to determine the location of the new piece or new group of pieces on the same hide or on another hide.

When flaws are detected on the hides used and stored, the layout takes into account the seriousness and the locations of the flaws. A portion of surface having a flaw is used or is not used for a piece depending on whether or not the degree of seriousness of the flaw is not more than the degree of seriousness tolerated for said piece, based on the information stored for this purpose with reference to the piece.

In any event, the desired layout is the layout for which the surface(s) of the hide(s) used is occupied optimally to minimize material wastage, in particular by making use of the stretching capacities of the leather, and of the possibilities of rotating the pieces relative to their preferential angular positions. Account is also taken of any border overshoot tolerances between zones having uniform characteristics on the hide. Known means for this purpose consist in using a program to simulate as high a number as possible of variant layouts and in choosing the most favorable. The stored stretching capacities of the leather, indicating the extent to which it can be stretched in the direction of the reference axis or in the direction perpendicular thereto, and the border overshoot tolerances between zones of the hide may be used during layout simulations, not necessarily systematically, but, where applicable, when an available location is of size only very slightly smaller than the size of a piece to be laid out. Once the optimal layout has been determined, it is stored (step 34) so as to be used during a subsequent cutting-out operation, or, as a basis, during future laying out for a similar article.

EXAMPLE OF USE

This example concerns the laying out, in leathers from cow hides, of the pieces required to make an article constituted by a three-seater sofa and by two armchairs.

Figure 3A:
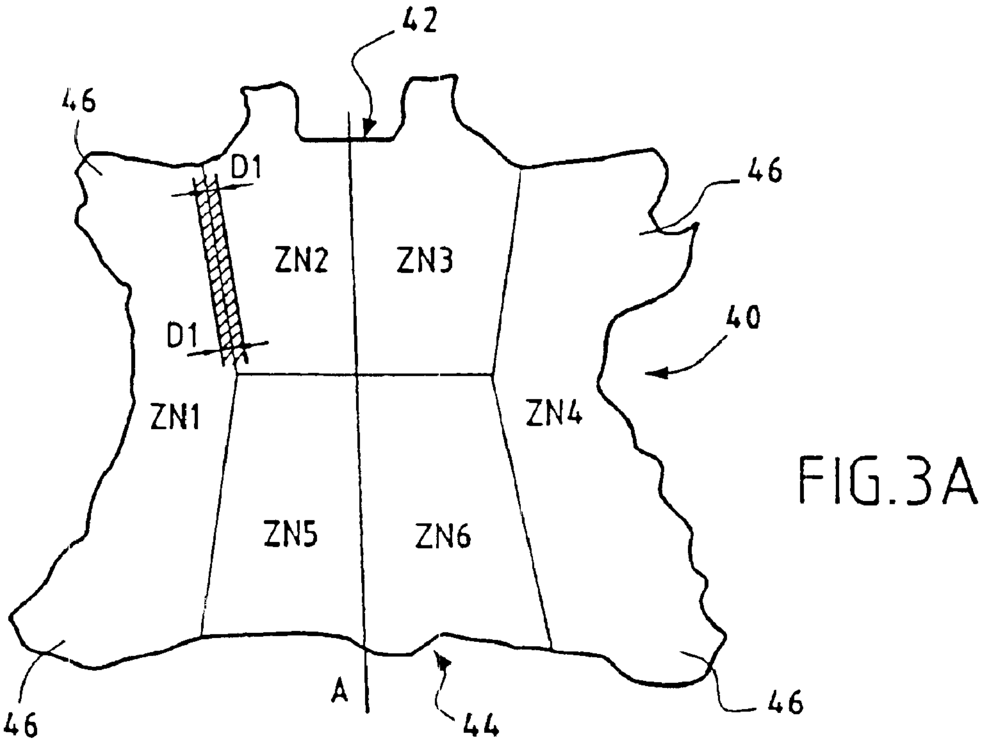
FIGS. 3A to 3B show masks used for implementing the method shown in FIG. 1.
Figure 3B:
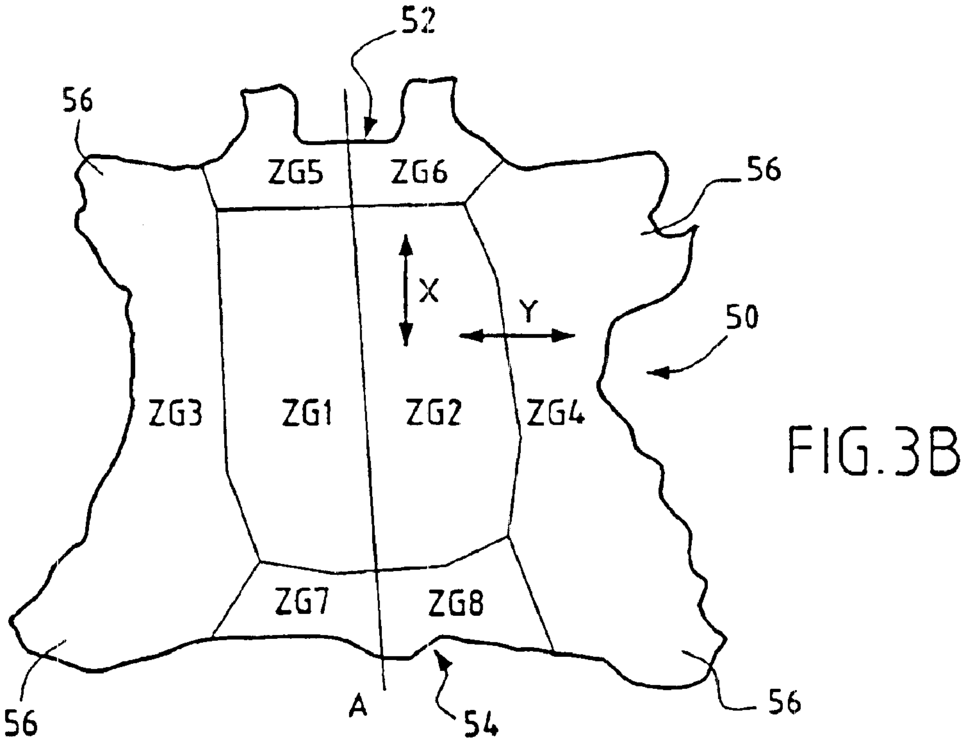

FIGS. 3A and 3B show models of masks that can be applied to cow hides.

The mask 40 of FIG. 3A is a color shade mask distinguishing between two levels of color shade of the leather, namely light and dark. On the mask 40, the axis A corresponding to the axis of the backbone is shown, as are the neck portion 42, the tail portion 44, and the leg portions 46 of the animal. The following zones are distinguished: light color zones ZN1 and ZN4 on the flanks and the legs, light color zones ZN2 and ZN3 on either side of the axis A going from the middle of the backbone to the neck, and dark color zones ZN5 and ZN6 on either side of the axis A going from the middle of the backbone to the tail.

The borders between the various color shade zones ZN1 to ZN6 are shown by straight line segments. However, the shade variation is progressive. The mask 40 may be associated with distance data D1 representing the border overshoot tolerance on either side said border, as shown between the zones ZN1 and ZN2.

The mask 50 of FIG. 3B is a grain size mask distinguishing between two levels of grain size of the leather, namely fine grain and coarse grain. This mask also shows the axis A corresponding to the backbone of the animal, and the neck portion 52, the tail portion 54, and the leg portions 56 of the animal. The following zones are distinguished: two fine grain zones ZG1, ZG2 occupying the central portion of the hide on either side of the axis A, coarse-grain zones ZG3, ZG4, each of which occupies a respective flank and the associated legs, and coarse grain zones ZG5, ZG6, ZG7, and ZG8 occupying the portions in the vicinity of the neck and of the tail, on either side of the axis A.

It is possible to associate the mask 50 with data representing the maximum stretching percentages by which the leather can stretch in the directions X and Y respectively parallel to and perpendicular to the axis A.

The masks 40 and 50 are of the same shape and size. They are stored, together with any associated data representing the stretching capacities of the leather, in order to be applied to all cow leathers.

It is immediately apparent that, using the same principle, masks can be formed that are applicable to hides of some other animal origin.

Figure 4:
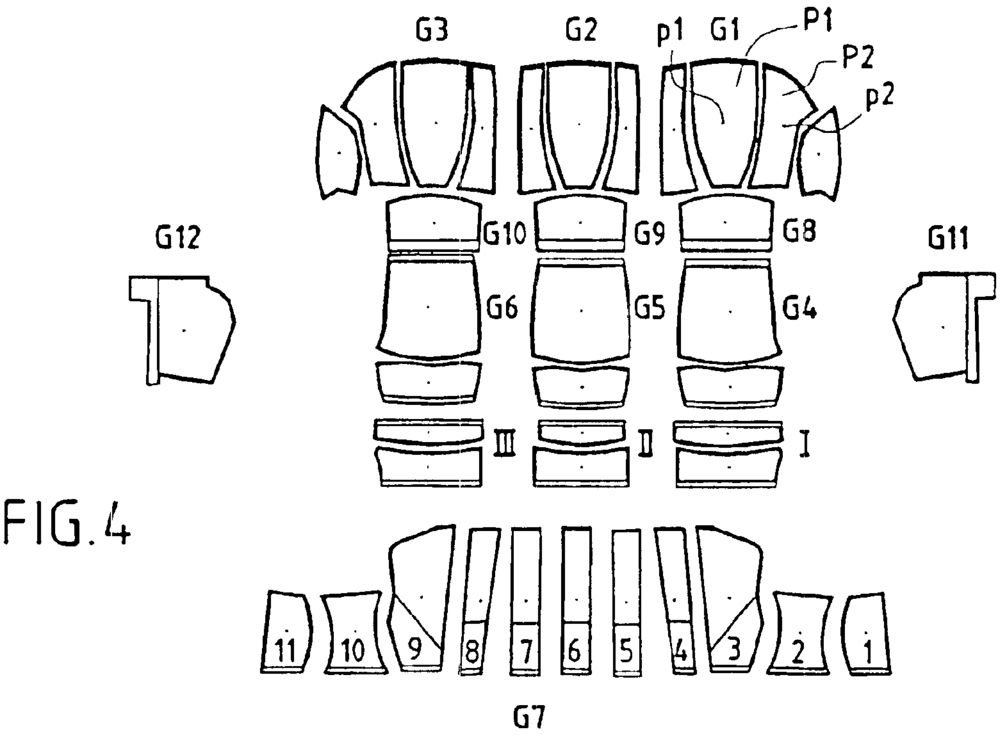
FIGS. 4 and 5 show particular implementations of the grouping together of the pieces necessary for manufacturing an article of leather which, in this example is a suite comprising a three-seater sofa, and two armchairs.
Figure 5:
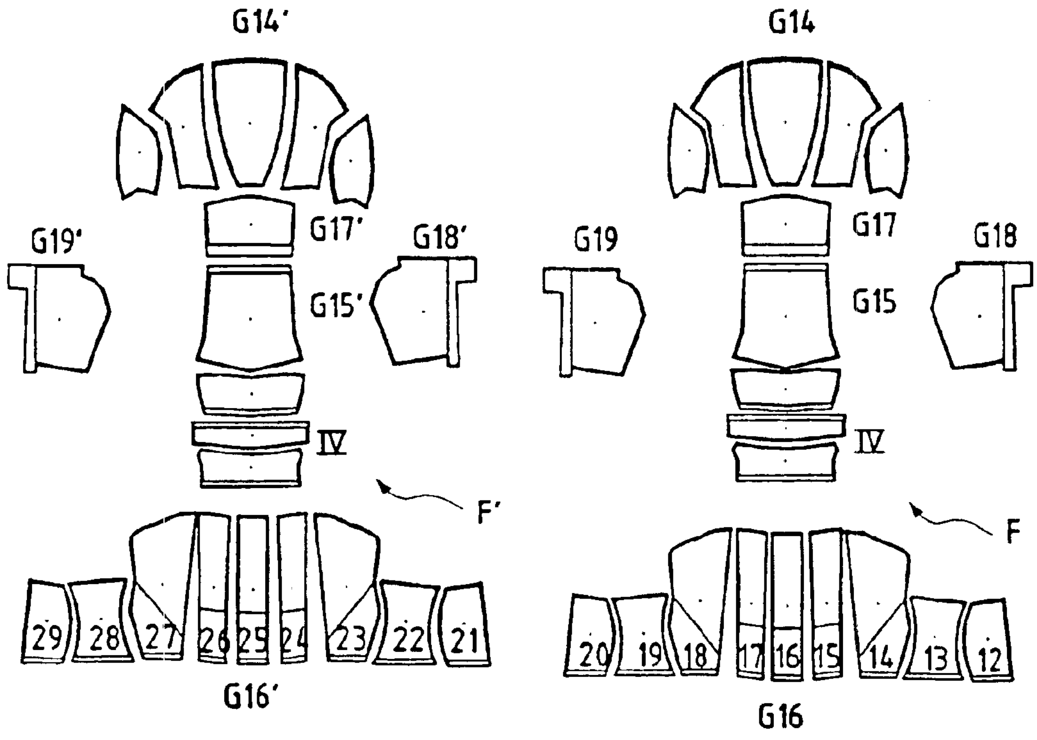

FIG. 4 diagrammatically shows a set of pieces of leather used for manufacturing a three-seater sofa 3, and FIG. 5 diagrammatically shows a set of pieces used for manufacturing a matching armchair.

In FIG. 4, certain component pieces are distributed into groups. A plurality of groups, each made up of a plurality of pieces, serve to make up respective functional sub-assemblies of the sofa. These groups are as follows: the "right seat back" group G1, and the "left seat back" group G3, each of which comprises 4 pieces, the "center seat back" group G2 comprising 3 pieces, the "right seat cushion" group G4, the "center seat cushion" group G5, and the "left seat cushion" group G6, each of which comprises 2 pieces, and the "structure" group G7 which comprises pieces (numbered 1 to 11) serving to trim the structure of the sofa. Other pieces individually constitute respective functional groups, GB, G9, and G10 for the "right lumbar support cushion", the "center lumbar support cushion", and the "left lumbar support cushion", and G11 and G12 for the "right armrest" and the "left armrest". The remaining pieces comprise pairs of linked parts I, II, and III.

The various pieces are linked together by links which, in this example are of four possible levels 1, 2/2', 3, and 4, in order of decreasing strength.

The level-1 links are between pieces between which there is a high constraint similitude requirement and a layout proximity constraint. They are the pieces in each of the functional sub-assemblies corresponding to the groups G1 to G6. The pieces making up a seat back or a seat cushion must have the same leather color shades, the same leather grain size, and the same angular positions on the leather, and they must also be laid out in proximity with one another. This proximity constraint is expressed by a maximum distance between characteristic points on the pieces, such as, for example, between the points $P_1$, and $P_2$ of the pieces $P_1$ and $P_2$ of the right seat back. this proximity constraint can be explained by the fact that the pieces must, for aesthetic reasons, have the highest possible similitude in appearance in addition to the same levels of shade and grain characteristics and the same angular position. In addition, since the pieces are to be assembled together, they have common outline portions, and it is thus advantageous for them to be laid out side-by-side.

The level-2 links are between pieces or groups of pieces that have the highest constraint similitude requirement between them (same shade, grain, and angular position), but without having a location proximity constraint. In this example, these links are the links between seat backs and associated lumbar support cushions.

The level-2' links are between pieces or groups of pieces that have constraint similitude and non-similitude relationships between them, e.g. same grain, same angular position, but opposite shades. In this example, these links are the links between center seat back and right seat back, between center seat back and left seat back, between center seat cushion and right seat cushion, and between center seat cushion and left seat cushion, so that the color shade varies in the sofa. Naturally, if such a variation were not desired, level-2 links would be adopted between these groups.

The level-3 links are between the pieces or groups of pieces that have a minimal constraint similitude or non-similitude requirement, e.g. same grain or same shade. In this example, these are the links between seat back and associated armrest, and between seat cushion and associated armrest.

The level-4 links are in fact zero links, allowing full freedom of positioning as regards shade and grain, and also angular position and proximity. They concern the structure pieces, and the free pieces.

The various above-mentioned groups of pieces and pieces may also be assigned degrees of layout priority indicating in which order they should preferably be laid out.

In this example, it is possible to assign the highest priority 1 to each of the functional groups G1 to G6 that comprise all of the pieces to which level-1 links are assigned, and then to assign a level-2 priority to the groups G8 to G10 in which level-2 links are assigned to the pieces, to assign a level-3 priority to the groups G11 and G12 whose pieces are assigned level-3 links, and to assign the lowest priority level 4 to the other pieces and groups of pieces.

Each piece or group of pieces to which an angular position constraint is assigned is associated with angular position tolerance information in the form of a maximum allowable angle of rotation (or angular offset) relative to the specified angular position. In most cases, the specified angular position is defined relative to the reference axis corresponding to the backbone. Angular positioning of the pieces such that their longest dimensions are perpendicular to or parallel to the reference axis is generally specified.

Each piece is also associated with flaw tolerance information indicating the degree of seriousness of the flaw on the leather that is tolerated for the piece.

In a manner similar to FIG. 4, FIG. 5 shows how certain component pieces of an armchair F are distributed in functional groups, namely a "seat back" group G14 comprising 5 pieces, a "seat cushion" group G15 comprising 2 pieces, and a "structure" group G16 comprising a plurality of pieces (numbered 12 to 20). Other pieces individually constitute functional groups: G17, G18, and G19 for the "lumbar support cushion", the "right armrest", and the "left armrest". The remaining pieces comprise two linked pieces IV.

In each group G14 and G15, the pieces are linked together by level-1 links. Group G14 and group G17 are linked together by a level-2 link. Groups G14 and G18, G14 and G19, G15 and G18, and G15 and G19 are linked together by level-3 links. The other pieces are linked together by level-4 links (no constraints).

Degrees of layout priority from 1 to 4 are assigned respectively to the groups G14 & G15, to group G17, to groups G18 & G19, and then to group G16 and the remaining pieces. When the pieces making up a sofa and one or more matching armchairs are to be placed in the layout, for groups having the same priority, it is possible to start with those of the sofa, followed by those of the armchair (s).

As in the case of the sofa shown in FIG. 4, each piece or group of pieces is associated with angular position tolerance information, and with leather flaw tolerance information.

FIG. 5 also shows the similar distribution of the groups G14' to G19' and of the linked pieces V of the second armchair F' (the "structure" group G16' comprises pieces numbered 21 to 29).

The shapes of the pieces, the way in which they are grouped together, the constraints assigned to them, the links defined, and accessory information constitute a file of linked constraint pieces. Such a file, for a suite made up of a sofa and of two armchairs, is stored.

It is immediately apparent that the principles described with reference to FIGS. 4 and 5 can be applied to any type of article whose manufacture requires pieces of leather to be assembled together and/or assembled to other elements.

It is thus possible to have a bank of files of linked constraint pieces corresponding to various types of articles to be manufactured.

In the example considered of a 3-seater sofa with 2 matching armchairs, a plurality of cow hides are necessary.

The hides supplied preferably come from the same batch, and they are digitized with information being recorded relating to flaws detected on each hide, and relating to the reference axis (backbone) of each hide.

Figure 6:
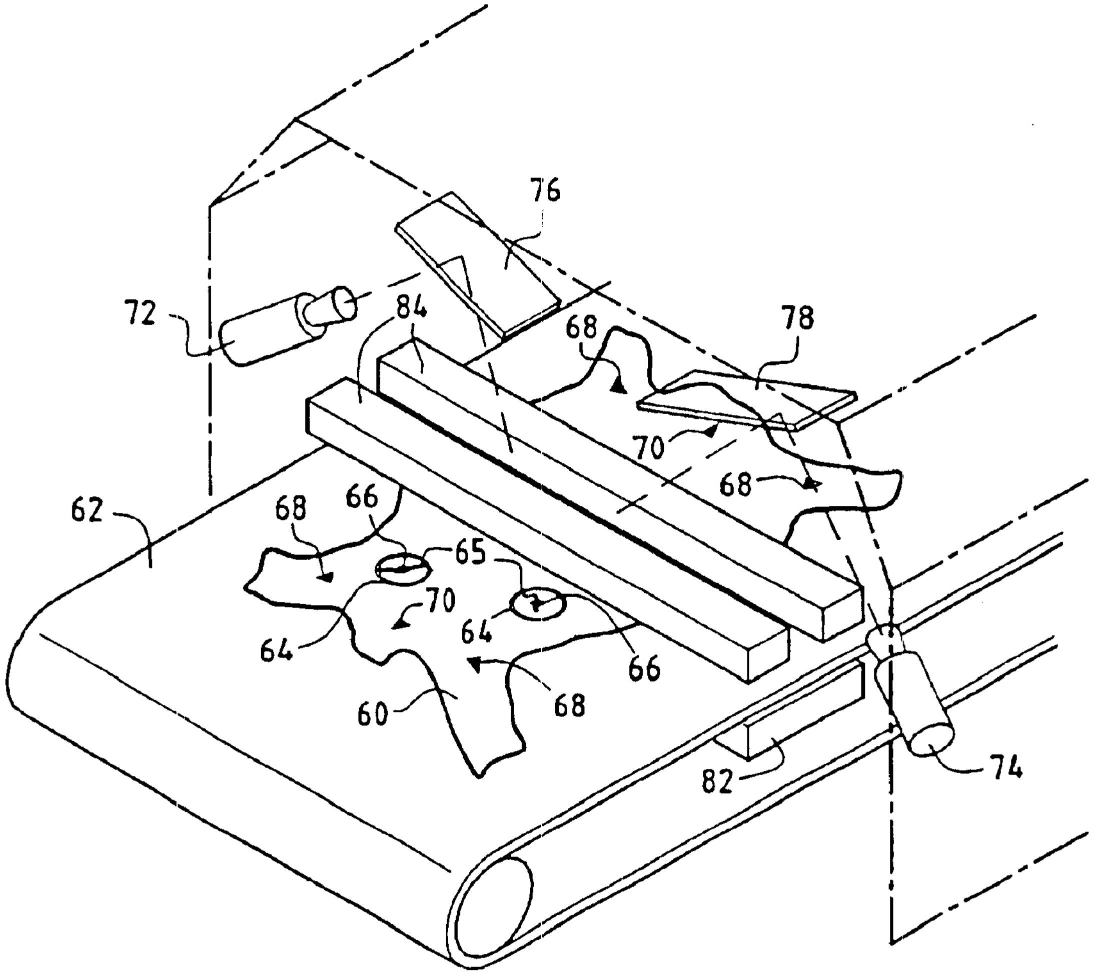
FIG. 6 is a a very diagrammatic view of a digitization station for digitizing a particular hide.

FIG. 6 is a very diagrammatic view of a digitization installation of the type described in the Applicant's International Patent Application No. WO 95/29 046.

A hide 60 to be digitized is laid flat on a conveyor table 62. While the hide is lying on the table, an operator looks for flaws 65. The operator indicates the existence of any flaws by means of pieces of string 64 that define their outlines, and indicates the seriousness of the flaws by means of elements 66 placed in the centers of the zones delimited by the pieces of string. Depending on the seriousness of the flaws, the elements 66 may have different shapes and/or sizes. The operator may also place marks 68, 70 on the hide so as to indicate the configuration and the disposition of the hide during digitization, and so that they can be reproduced faithfully during subsequent operations. The marks 70 are disposed along the backbone so as to indicate the position of the reference axis of the hide.

Digitization is performed by moving the conveyor table 62 under a gantry supporting two linear cameras 72 and 74 which, by means of respective mirrors 76, 28 scan respective segments, each of which extends over about one half of the width of the digitization zone.

During a first stage, the hide is lit from below by means of a source 82. The cameras 72, 74 transmit signals to a control unit to make it possible to establish graphics information representing the outline of the hide. During a second stage, the hide is displaced in the reverse direction under the gantry while it is lit by a source 84 situated above the hide. The positions of the pieces of string 64 and marks 68, 70, and the shapes of the elements 66 are detected by the cameras 72, 74, and the corresponding signals are sent to the control unit for establishing flaw information (indicating the locations and the seriousness of the detected flaws) and reference information indicating the configuration and disposition of the hide, in particular information relating to the reference axis.

Other known methods may be used for automatically digitizing hide outlines and for visually or automatically detecting the reference axis, as well as flaws and the degree of seriousness of flaws.

After the necessary hides have been digitized, the masks 40, 50 are applied to the images of the hides, as delivered by the stored graphics information representing their outlines, by causing their reference axes to coincide with the axis A and by applying a geometrical transformation so as to match them to the real dimensions of the hide. Superposing the masks with the image of the hide by causing the reference axes to coincide makes it possible to apply the masks simply and accurately even when the hide is not complete. However, it remains possible to consider using an automatic process for applying the masks without the reference axis of the hide being previously located.

Figure 7:
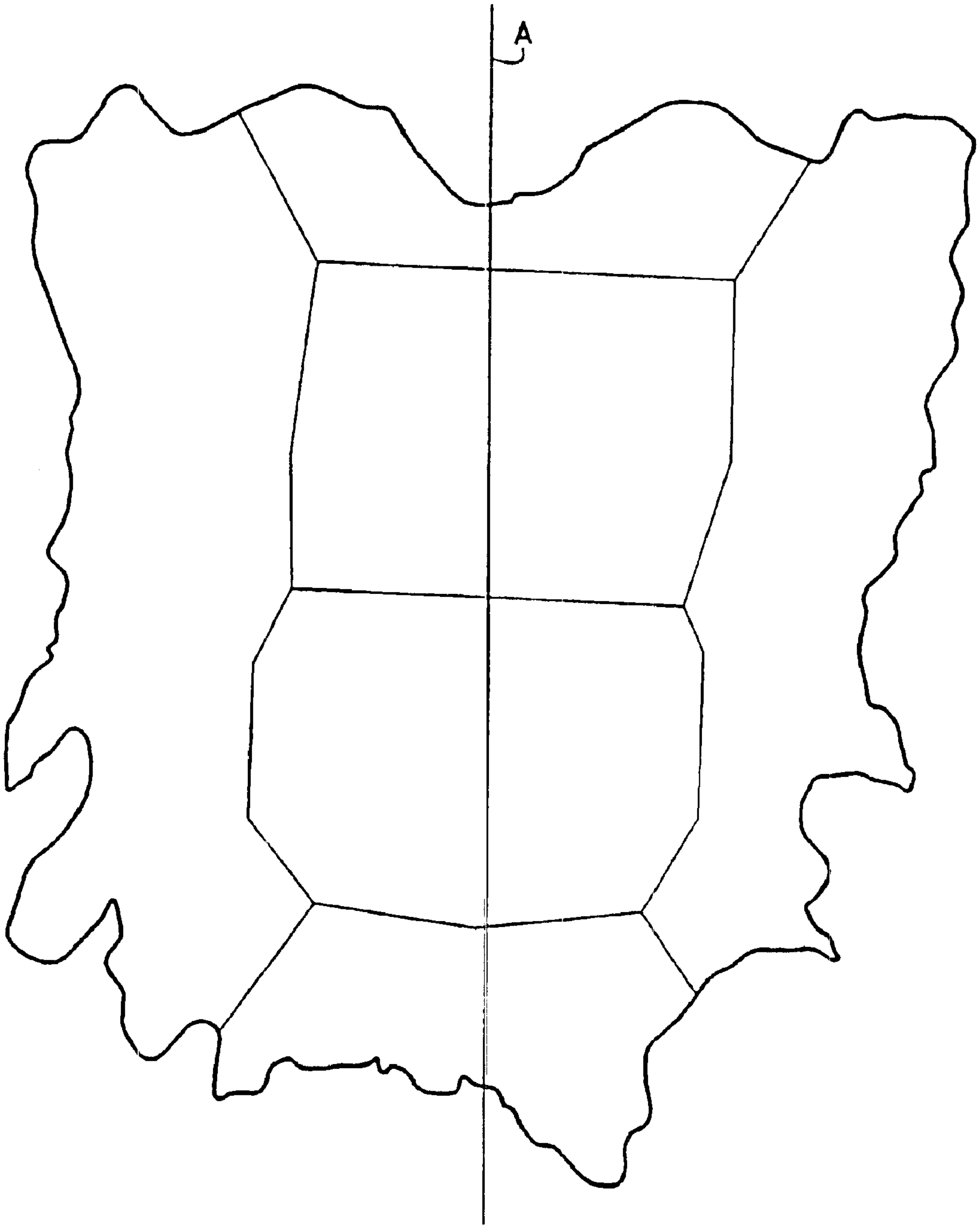
FIG. 7 shows the result of applying the masks of FIGS. 2 and 3 to the image of a digitized hide.

Applying the masks 40, 50 to the image of a digitized hide makes it possible to define thereon a set of zones having uniform characteristics, i.e. light or dark shades associated with fine grain or coarse grain. The result is shown in FIG. 7. it should be noted that distinct adjacent zones having the same uniform characteristics are situated substantially symmetrically relative to the reference axis A. By providing zones that are distinct although they have the same characteristics on either side of the backbone, it is possible to simplify the automatic laying out operation for pieces that should not straddle the backbone. It should also be noted that the borders between zones can be defined loosely by combining the border overshoot tolerances associated with the masks.

Figure 8:
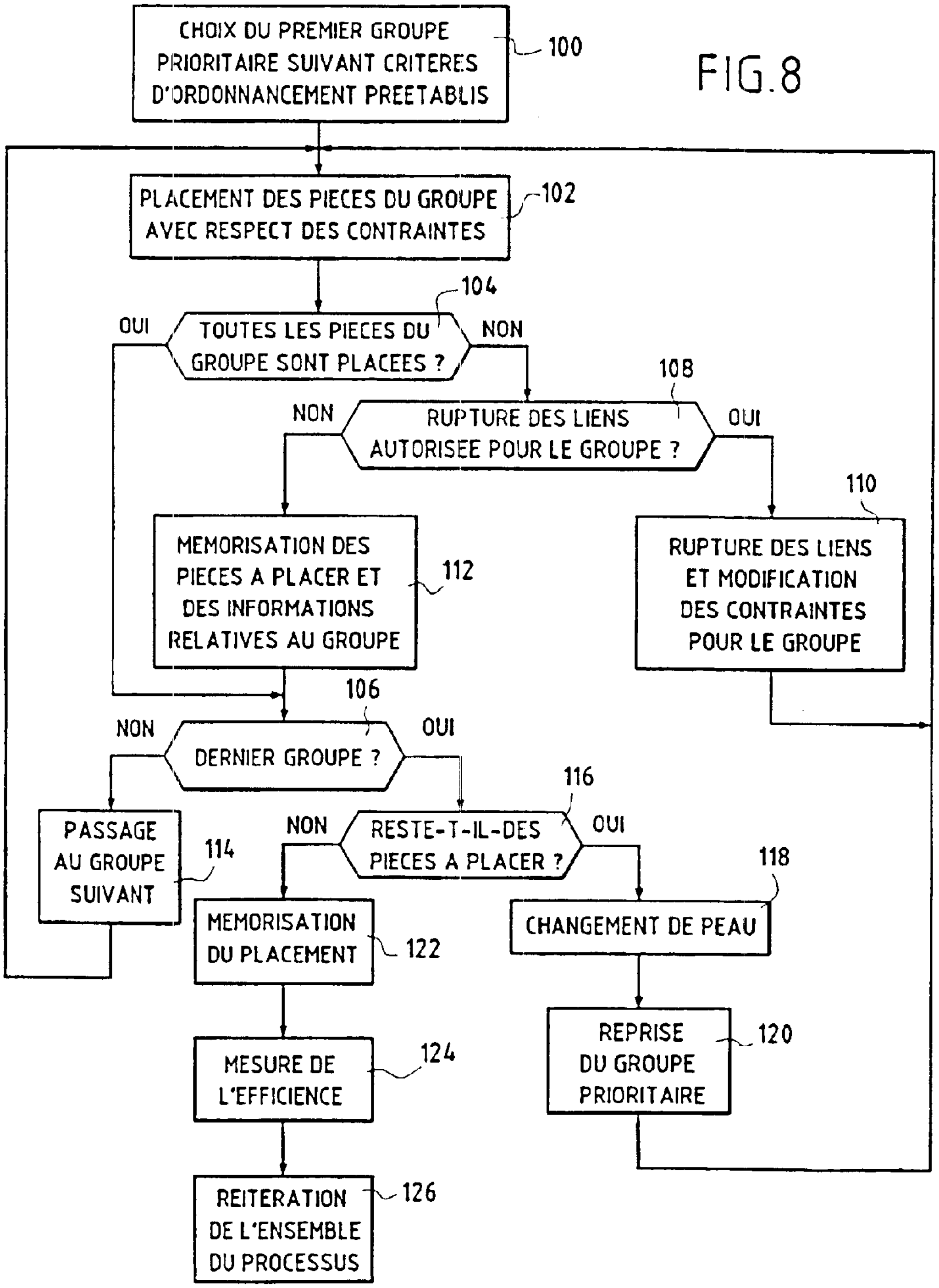
FIG. 8 is a flow chart showing how automatic laying out takes place for making the article shown in FIGS. 4 and 5.
Figure 9:
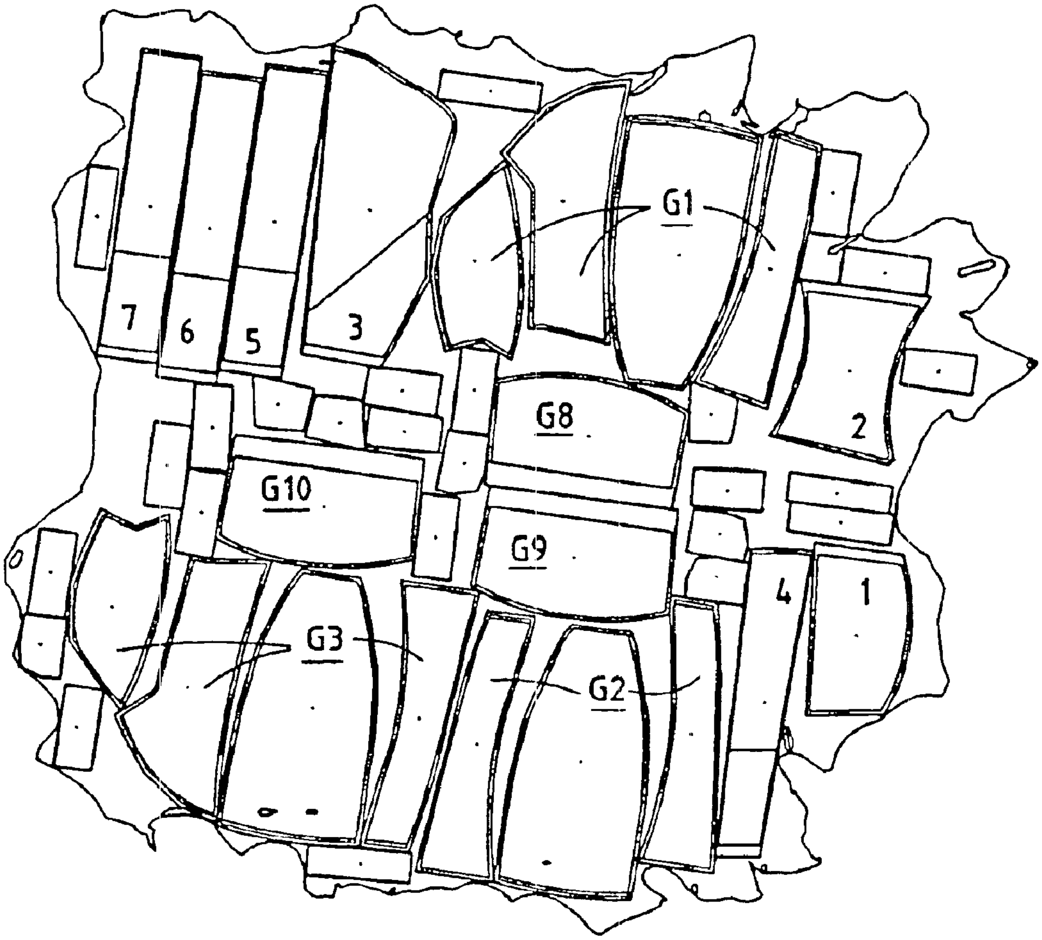
FIGS. 9 to 12 show the result of the pieces of FIGS. 4 and 5 being laid out on 4 hides, by implementing the laying out process shown in FIG. 8.
Figure 10:
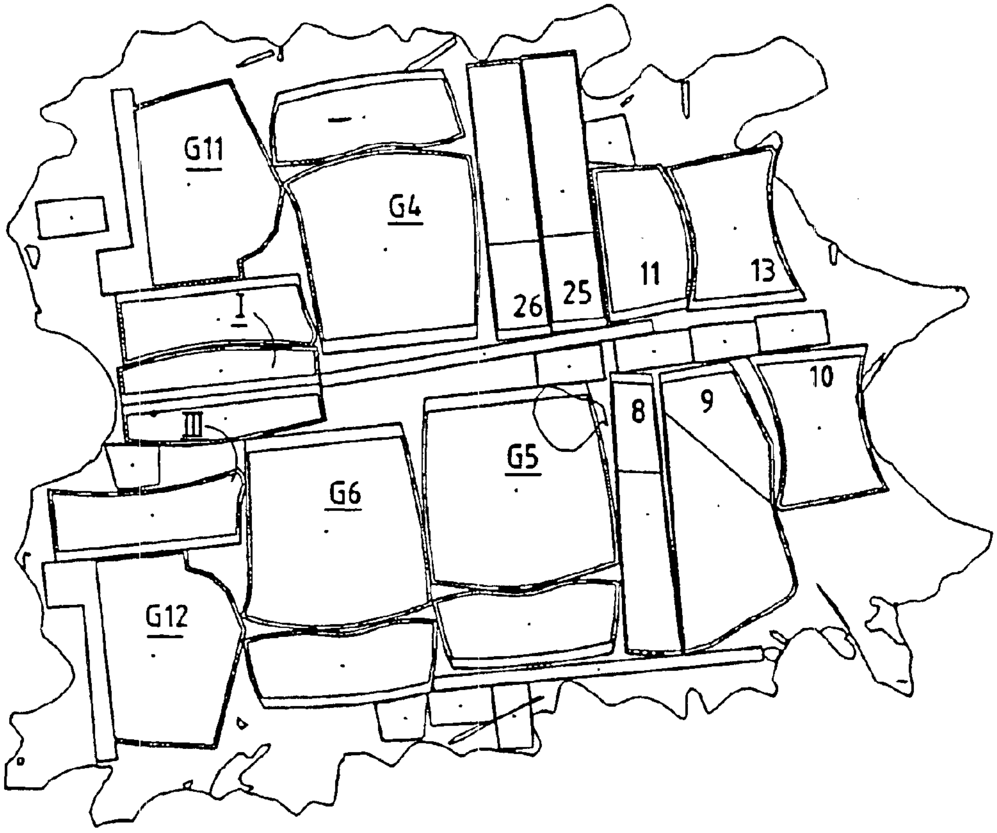
Figure 11:
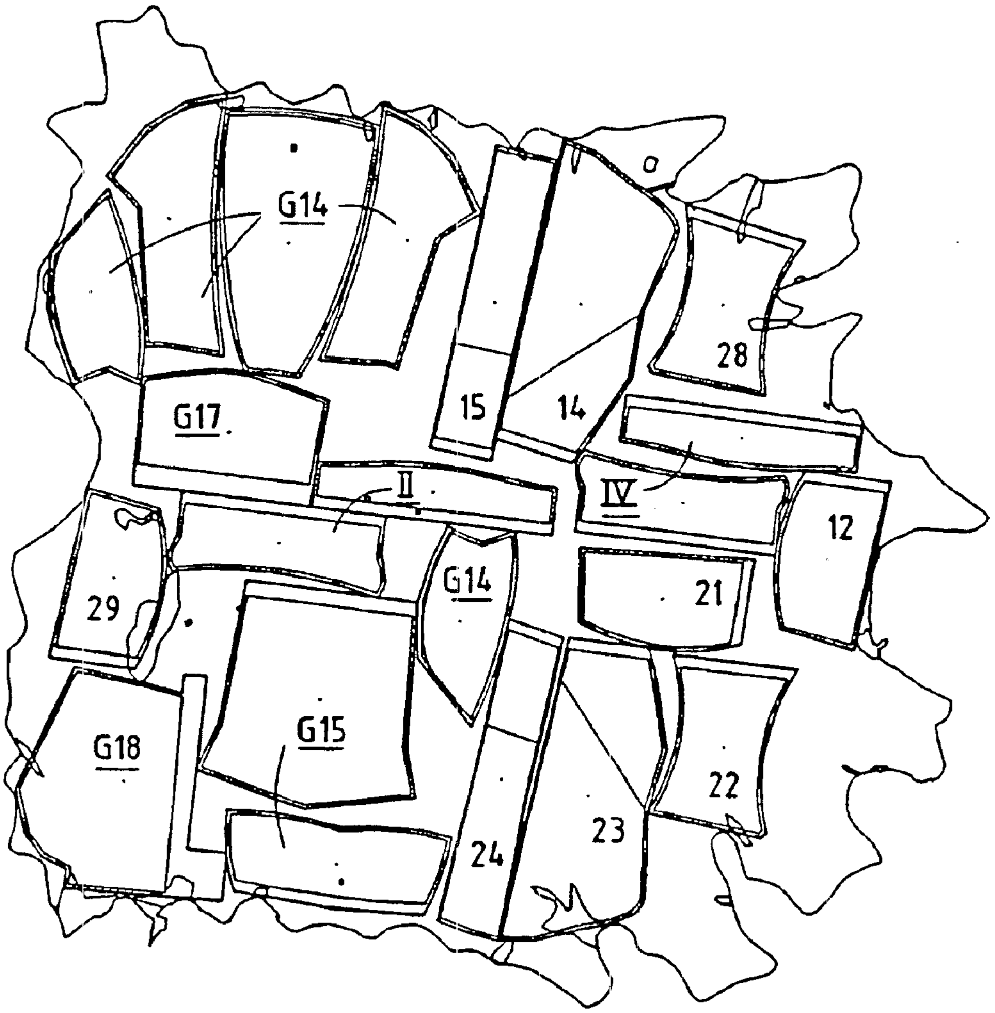
Figure 12:
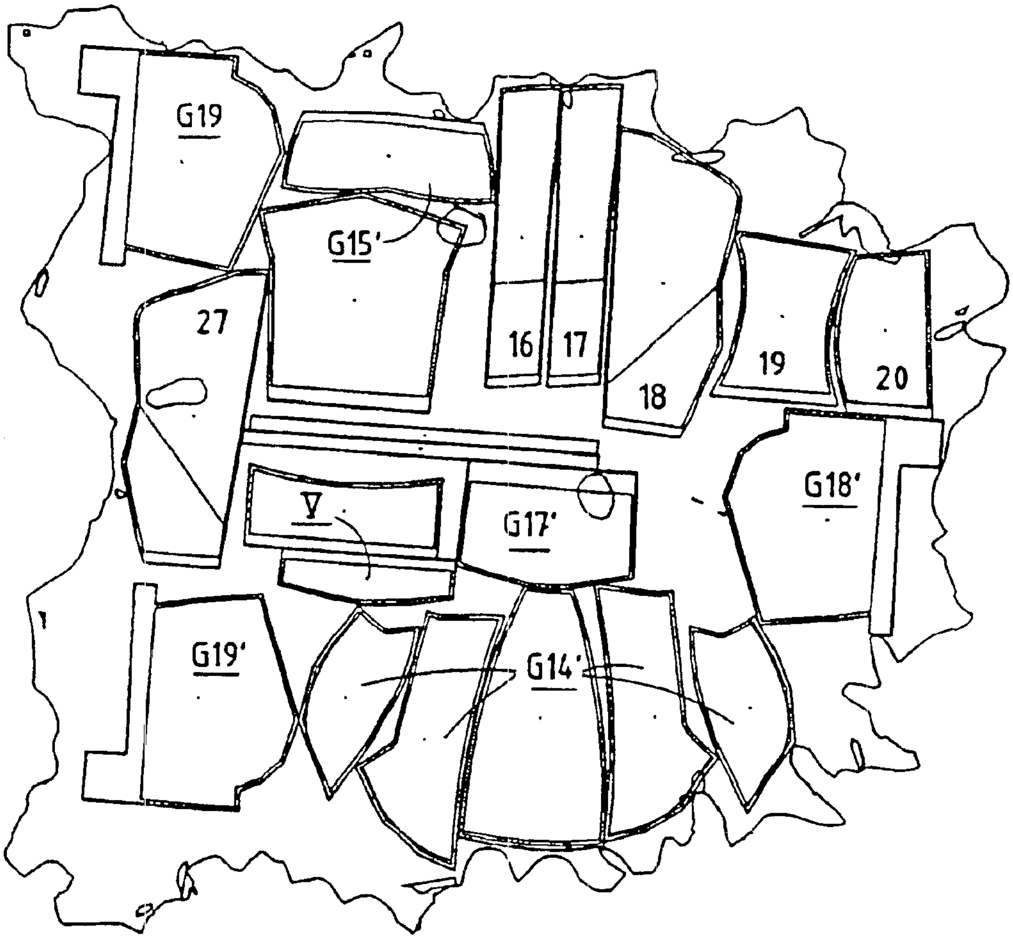

Once the various hides to be used have been subdivided into uniform zones by applying the masks, the automatic laying out process can be performed. The operations performed are as follows (FIG. 8):

As a function of the predefined ordering criteria, the first priority group is chosen (step 100). The following step (102) consists in laying out on the hide in question the pieces making up the group, while satisfying the constraints assigned to the pieces intrinsically or in relation to other pieces of the same group (e.g. physical proximity). If all of the pieces of the group have been laid out (test 104), then a test (test 106) is run to determine whether the group being processed is the last group. If all of the pieces of the group have not been laid out, then a test (test 108) is run to determine whether breaking the links is authorized. If it is, the links are broken (step 110) and the process returns to step 102 after modifying the constraints, and therefore the link level for the group. If link breaking is not authorized, the information identifying the pieces of the group that have not been laid out is stored (step 112), together with the other information relating to the group, before going on to test 106.

If the group is not the last group (answer to test 106 is "no"), the process goes on to the following group which is linked to the preceding group, or which follows it as a function of the established ordering criteria (step 114), and the process returns to step 102.

If it is the last group, a test is run to determine whether pieces remain to be laid out (test 116). If so, then a hide change is made (step 118), and the process returns to step 102 by starting with the group having the highest priority level among all of the pieces that have not been laid out (step 120).

If there are no more pieces to be laid out, the resulting layout is stored (step 122), and its efficiency is measured (step 124). The entire process can then be re-iterated (step 126) a predetermined number of times or until the end of a predetermined period, the finally chosen layout then being the layout offering the highest efficiency. The efficiency is measured, for example, by the total surface area of hide used. The smaller this area, the higher the efficiency.

The result of the automatic laying out as performed on 4 hides is shown in FIGS. 9 to 12.

On the first hide (FIG. 9), the three groups of pieces G1, G2, and G3 representing the seat backs of the sofa have been laid out in compliance with the links 2' between the groups of pieces so as to obtain the desired shade variation with color continuity along the sofa. Three lumbar support pieces G8, G9, and G10 are placed relative to the associated seat backs in compliance with the links 2. On the first hide, some of the pieces of the group G7 (structure) are laid out in compliance with the order in which the pieces are to be assembled together. The pieces of groups G1, G2, G3, G7, G8, G9, and G10 are angularly positioned perpendicularly to the reference axis A. The remainder of the hide is used to lay out free pieces of the sofa or of the armchairs.

On the second hide (FIG. 10), the three groups of pieces G4, G5, and G6 representing the seat cushions of the sofa are laid out in compliance the links 2' between the groups of pieces so as to obtain the desired shade variation in the same way as for the seat backs. The pieces G11, G12 representing the armrests are laid out in compliance with the links 3, i.e. in zones having the same color shade (dark) as the side seat backs. Some of the group G7 (sofa structure) is laid out in compliance with the order of the pieces as are some of each of the groups G16 and G16' (armchair structures) and the pairs of linked parts I and III. the pieces are angularly positioned substantially perpendicularly to the reference axis A. The remainder of the hide is used to lay out free pieces of the sofa or of the armchairs.

On the third hide (FIG. 11), the following are laid out: a group G14 representing an armchair seat back by positioning one of the pieces in a symmetrical portion of the hide, a group G15 representing an armchair seat cushion, a group G17 representing an armchair lumbar support cushion, and a group G18 representing the right armrest of an armchair. The layout complies with the links of level 3 between the groups G14 and G15, G14 and G17, and G15 and G18. Some of each of the groups G16 and G16' (armchair structures) is laid out in compliance with the order of the pieces, as are the pairs of linked pieces II and IV. The pieces are disposed substantially perpendicularly to the reference axis A. The remainder of the hide is used to lay out free pieces of the sofa or of the armchairs.

On the fourth hide (FIG. 12) the following are laid out: two groups G14' and G15' representing an armchair seat back and an armchair seat cushion, three groups G18', G19, and G19' representing the two left armrests and a right armrest of the armchairs, a group G17' representing an armchair lumbar support cushion, and the linked pieces V. The layout complies with the level-3 links between the groups G14, and G18', and G14' and G19'. The remaining pieces of the groups G16, G16' representing the structures of the two armchairs and the remaining free pieces fill in some of the remaining area of the hide.

What is claimed is:

1. A method of automatically laying out pieces to be cut out from remnants of a flexible material having non-uniform characteristics, and to be used for making articles, said method comprising:

establishing, for a given type of remnant, at least one generic mask generically applicable to the given type of remnant and whose area is subdivided into zones which correspond to different value levels of a characteristic of the given type of remnant;

assigning a set of constraints to at least some of said pieces wherein the set of constraints includes at least one value constraint for a characteristic of the given type of remnant;

defining links between at least some of the pieces, wherein the links have different levels as a function of relationships imposed between constraints assigned to the pieces;

digitizing an individual remnant of the given type in order to obtain an image of the individual remnant;

applying the at least one generic mask to the image by performing dimension matching so as to subdivide the image of the individual remnant into zones having uniform characteristics; and laying out the pieces automatically by disposing the pieces in the zones as a function of any constraints assigned to the pieces, and in compliance with the links defined between the pieces.

2. A method according to claim 1, characterized in that, for a given type of remnant, the at least one generic mask is chosen from:

a mask comprising zones having different values for the color shade of the flexible material; and a mask comprising zones having different values for a surface appearance characteristic of the flexible material.

3. A method according to claim 2 for automatically laying out pieces to be cut out from hides so as to be used to make articles of leather, said method being characterized in that a mask is established that comprises zones having different values for the grain of the leather.

4. A method according to claim 1, characterized in that a the mask is applied to the image of the individual remnant by causing reference axes associated with the mask and with the remnant respectively to coincide.

5. A method according to claim 4 for automatically laying out pieces to be cut out from hides so as to be used to make articles of leather, said method being characterized in that an axis corresponding to the backbone of the animal from which the hide is taken is used as the reference axis.

6. A method according to claim 4, characterized in that the reference axis is determined by indicating or marking it manually on the remnant.

7. A method according to claim 4, characterized in that the reference axis is determined by analyzing the image of the digitized remnant.

8. A method according to claim 1, characterized in that at least some of the pieces of a determined type of article are distributed into groups, and any links between the groups and between groups and pieces are defined.

9. A method according to claim 8, characterized in that at least some pieces are distributed into functional groups, each of which comprised the pieces(s) of a sub-assembly of the article.

10. A method according to claim 1, characterized in that at least some pieces are assigned one or more constraints chosen from:

a value level for the color shade of the material;

a value for a surface state characteristic of the material; and a preferential angular position relative to a reference axis of the remnant.

11. A method according to claim 10, characterized in that at least some pieces are assigned a preferential angular position constraint relative to a reference axis of the remnant, and are associated with angular position tolerance data corresponding to a maximum allowed angle of rotation relative to the preferential angular position.

12. A method according to claim 1, characterized in that in that links are defined between at least some pieces, which links have different levels as a function of proximity constraints assigned to the pieces.

13. A method according to claim 12, characterized in that the proximity constraints between two pieces are expressed in the form of a maximum distance between two characteristic points on the pieces, or in the form of a maximum difference between values levels of one or more characteristics of the material of the remnant.

14. A method according to claim 1, characterized in that, for a given type of remnant, a possible coefficient of stretching of the material in at least one determined direction relative to a reference axis of the remnant is defined, and the layout is defined by optionally using the defined stretching capacity.

15. A method according to claim 1, characterized in that at least some pieces or groups of pieces are assigned respective layout priority levels, and the laying out is performed in order of decreasing priority.

16. A method according to claim 15, characterized in that the level of link between a piece or a group of pieces and another piece or group of pieces corresponds directly to the priority level assigned to the piece or group of pieces.

17. A method according to claim 1, characterized in that any flaws on each remnant are detected, and each detected flaw is associated with data representing one of a plurality of predetermined degrees of seriousness, and flaw information is stored comprising data indicating the locations of the flaws on the remnant and the associated data indicating the levels of seriousness.

18. A method according to claim 17, characterized in that each of the pieces of a determined type of article is associated with information representing the degree of flaw seriousness tolerated by each piece.

19. A method for automatically laying out pieces to be cut out from an animal hide having non-uniform characteristics over its area, the method comprising:

assigning a relative value of a given hide characteristic to each of at least some of the pieces to be cut out;

defining a link between at least some of the pieces at least partly in accordance with a respective relative value of the given hide characteristic assigned to the at least some of the pieces to be cut;

applying a generic mask corresponding to a given type of animal hide to a respective hide of the given type, the mask defining a plurality of zones on the respective hide, each zone corresponding to a hide characteristic that is substantially uniform thereacross;

automatically laying out the pieces to be cut on the respective hide in the zones defined by the mask in accordance with the hide characteristic of each zone of the mask, the relative value of the given hide characteristic assigned to the at least some of the pieces, and the link or links defined between the pieces.

20. The method according to claim 19, wherein the mask comprises one of zones corresponding color shades of the hide, and zones corresponding to a surface appearance characteristic of the hide.

21. The method according to claim 19, wherein applying a mask comprises applying a mask to a digitized image of a respective hide of the given type.

22. The method according to claim 21, wherein applying the mask to the digitized image of a respective hide of the given type comprises performing dimensional matching between the mask and the digitized image of the respective hide of the given type.

* * * * *